United States Patent
Bennah et al.

(10) Patent No.: US 10,078,413 B2
(45) Date of Patent: *Sep. 18, 2018

(54) GRAPHICAL ASSOCIATION OF TASK BAR ENTRIES WITH CORRESPONDING DESKTOP LOCATIONS

(71) Applicant: International Business Machines Corporation, Armonk, NY (US)

(72) Inventors: Albert D. Bennah, Durham, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 864 days.

This patent is subject to a terminal disclaimer.

(21) Appl. No.: 14/514,366

(22) Filed: Oct. 14, 2014

(65) Prior Publication Data

US 2015/0033168 A1   Jan. 29, 2015

Related U.S. Application Data

(63) Continuation of application No. 11/538,231, filed on Oct. 3, 2006, now Pat. No. 8,893,038.

(51) Int. Cl.
*G06F 3/048* (2013.01)
*G06F 3/0481* (2013.01)

(52) U.S. Cl.
CPC ........ *G06F 3/0481* (2013.01); *G06F 3/04812* (2013.01); *G06F 2203/04804* (2013.01)

(58) Field of Classification Search
CPC ......... G06F 3/0481; G06F 2203/04804; G06F 3/04812
See application file for complete search history.

(56) References Cited

U.S. PATENT DOCUMENTS

| | | | | |
|---|---|---|---|---|
| 5,892,511 A | * | 4/1999 | Gelsinger | G06F 3/0481 715/790 |
| 2003/0063126 A1 | * | 4/2003 | Yanchar | G06F 3/0481 715/781 |
| 2003/0117440 A1 | | 6/2003 | Hellyar et al. | |
| 2003/0189597 A1 | | 10/2003 | Anderson et al. | |
| 2004/0066408 A1 | | 4/2004 | Meyers et al. | |
| 2005/0044058 A1 | | 2/2005 | Matthews et al. | |
| 2005/0088447 A1 | * | 4/2005 | Hanggie | G06F 3/0481 345/545 |
| 2005/0125741 A1 | | 6/2005 | Clow et al. | |
| 2005/0132299 A1 | | 6/2005 | Jones et al. | |

(Continued)

*Primary Examiner* — Patrick F Riegler
(74) *Attorney, Agent, or Firm* — Steven M. Greenberg, Esq.; CRGO Law

(57) ABSTRACT

Embodiments of the present invention address deficiencies of the art in respect to task bar management and provide a method, system and computer program product for graphical association of task bar entries. In one embodiment of the invention, a method for graphically associating a window with a task bar entry in a windowing operating system GUI can be provided. The method can include rendering multiple windows in a z-space sequence in a desktop of the windowing operating system graphical user interface and detecting a proximity event for an entry in a task bar for the windowing operating system graphical user interface. In response to detecting the proximity event, a corresponding one of the windows in the desktop can be highlighted without re-ordering the z-space sequence.

4 Claims, 3 Drawing Sheets

(56) References Cited

U.S. PATENT DOCUMENTS

2006/0061597 A1* 3/2006 Hui ................... G06F 3/0481
　　　　　　　　　　　　　　　　　　345/629
2006/0224986 A1* 10/2006 Lindsay ............. G06F 3/0481
　　　　　　　　　　　　　　　　　　715/766
2006/0242602 A1* 10/2006 Schechter .......... G06F 3/04817
　　　　　　　　　　　　　　　　　　715/838

* cited by examiner

GRAPHICAL ASSOCIATION OF TASK BAR ENTRIES WITH CORRESPONDING DESKTOP LOCATIONS

CROSS-REFERENCE TO RELATED APPLICATION

This application is a Continuation of U.S. application Ser. No. 11/538,231, filed Oct. 3, 2006, which is incorporated herein by reference in its entirety.

BACKGROUND OF THE INVENTION

Field of the Invention

The present invention relates to the field of user interface desktop management and more particularly to task bar entry management for a graphical user interface.

Description of the Related Art

The conventional graphical user interface (GUI) has been widely used for many years. The primary function of the GUI includes providing visual controls with which the end-user can interact with an underlying application. Though the common GUI includes many stock visual controls, a select few visual controls can be combined to accommodate most computer-human interactions required by an application. Notably, GUI controls not only facilitate access to the logic of an application, but also GUI controls form an integral part of the underlying operating system where the operating system is a graphical windowing based operating system.

The most popular windowing based operating systems support a desktop paradigm in which multiple windows hosting views to different applications can occupy the x-y space of a virtualized desktop. The different windows can overlap one another such that a z space of windowing depth can be provided. An interacting end user can select one window at a time for activation while the other windows on the desktop can remain inactive. When active, a window can receive user input events such as keyboard strokes and mouse clicks. When inactive, the window will not receive user input events generally.

A virtually limitless number of windows can be opened on a desktop subject to the memory limitations of a host computing platform. Notwithstanding, once more than a handful of windows have been opened, switching between different windows can be cumbersome. Historically, accelerated keystroke combinations such as ALT-TAB have acted to enable a quick switching from one window to the next. Additionally, a task bar disposed at the perimeter of the desktop has been used to provide a quick selection method for an inactive window. In using a task bar, literally an activatable icon for each window is disposed serially on the perimeter. To switch to a particular window, one need only activate the corresponding activatable icon in the task bar.

Obviously, opening too many windows in the desktop can result in an unmanageable sequence of activatable icons in the task bar such that each icon is too small to convey a visual association with a particular window. Consequently, the traditional task bar does not treat each window identically. Rather, for windows hosting a distinct view to an application, a single corresponding activatable icon can be placed in the task bar; but, for multiple windows for the same application, only a single activatable icon is placed in the task bar as a composite representation of the windows. The single activatable icon, when activated does not immediately switch to the corresponding window. Rather, a pop-up list of different windows for the application can be displayed. Only then, can a selection of a particular window result in the activation of the particular window.

In the latter circumstance, determining an association between an activatable icon in a pop-up list for a task bar entry can be challenging. Selecting an unintended activatable icon can result in the activation of an undesirable window. Worse yet, in as much as end users often prefer a particular ordering of windows in the z-space of the desktop, accidentally selecting an unintended window can destroy the order chosen by the end user. For many windows in a desktop, re-arranging a proper order in z-space in of itself can be time consuming.

BRIEF SUMMARY OF THE INVENTION

Embodiments of the present invention address deficiencies of the art in respect to task bar management and provide a novel and non-obvious method, system and computer program product for graphical association of task bar entries. In one embodiment of the invention, a method for graphically associating a window with a task bar entry in a windowing operating system GUI can be provided. The method can include rendering multiple windows in a z-space sequence in a desktop of the windowing operating system graphical user interface and detecting a proximity event for an entry in a task bar for the windowing operating system graphical user interface. In response to detecting the proximity event, a corresponding one of the windows in the desktop can be highlighted without re-ordering the z-space sequence.

In one aspect of the embodiment, highlighting a corresponding one of the windows in the desktop without re-ordering the z-space sequence can include applying a distinct border to the corresponding one of the windows in the desktop without re-ordering the z-space sequence. In another aspect of the embodiment, highlighting a corresponding one of the windows in the desktop without re-ordering the z-space sequence can include rendering a phantom copy of the corresponding one of the windows in a foreground position in the z-space sequence and in an x-y space position of the desktop comparable to an x-y space position of the corresponding one of the windows.

In yet another aspect of the embodiment, highlighting a corresponding one of the windows in the desktop without re-ordering the z-space sequence can include rendering a thumbnail image of the corresponding one of the windows in the desktop. Finally, in even yet another aspect of the embodiment, highlighting a corresponding one of the windows in the desktop without re-ordering the z-space sequence can include rendering a phantom copy of the corresponding one of the windows in a minimized state in a foreground position in the z-space sequence and in an x-y space position of the desktop comparable to an x-y space position of the corresponding one of the windows when in a normalized state, and highlighting the task bar.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1A:
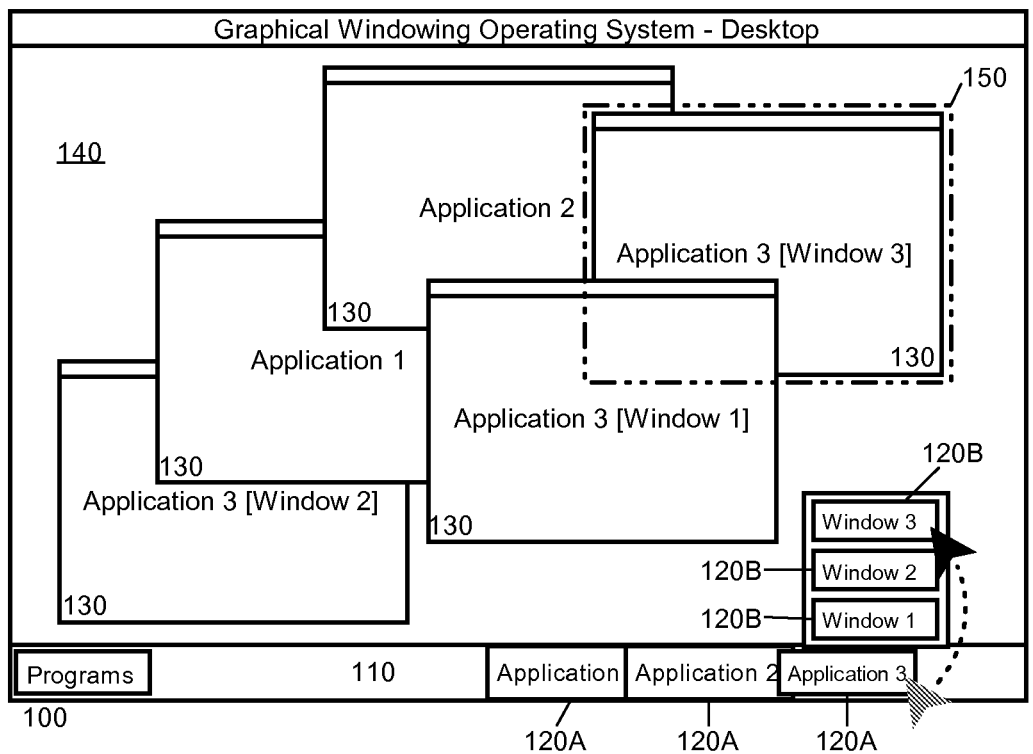
FIGS. 1A through 1D, taken together, are a pictorial illustration of a windowing operating system desktop configured for task bar graphical association.

Embodiments of the present invention provide a method, system and computer program product for task bar graphical association in a windowing operating system. In accordance with an embodiment of the present invention, a z-space ordering of windows can be established in the desktop. Each of the windows can be associated with a corresponding task bar entry in a task bar in the desktop. Responsive to a proximity event detected for an entry in the task bar, a window in the z-space ordering associated with the entry can be highlighted in place without affecting the z-space ordering. In this way, an interacting end user can identify the associated window without causing a reordering of the windows in the z-space of the desktop.

In further illustration, FIGS. 1A through 1D, taken together, are a pictorial illustration of a windowing operating system desktop configured for task bar graphical association. Beginning first in FIG. 1A, a windowing operating system GUI 100 can include a desktop 140 in which multiple windows 130 for multiple different applications can be rendered in a specified order in the z-space of the desktop 140. A task bar 110 can be provided in the GUI 100 and can include multiple different task bar entries 120A, each corresponding to a window 130 in the desktop 140. Optionally, for multiple windows 130 associated with a single application, a pop-up window of task bar entries 120B can be provided in response to the activation of a parent entry 120A in the task bar 110.

When a proximity event such as a mouse over is detected in respect to a particular entry 120A, 120B in the task bar 110, a corresponding one of the windows 130 can be identified and accorded a visually highlight 150 without altering the ordering of windows 130 in the z-space of the desktop 140. The visual highlight 150 can include, for instance a different color for the borders of the corresponding one of the windows 130, or an additional, distinctive border applied to the perimeter of the corresponding one of the windows 130. In this way, an interacting end user can readily identify any of the windows 130 associated with a particular one of the entries 120A, 120B in the task bar 110 merely by running a mouse over the particular one of the entries 120, 120B of the task bar 110.

Figure 1B:
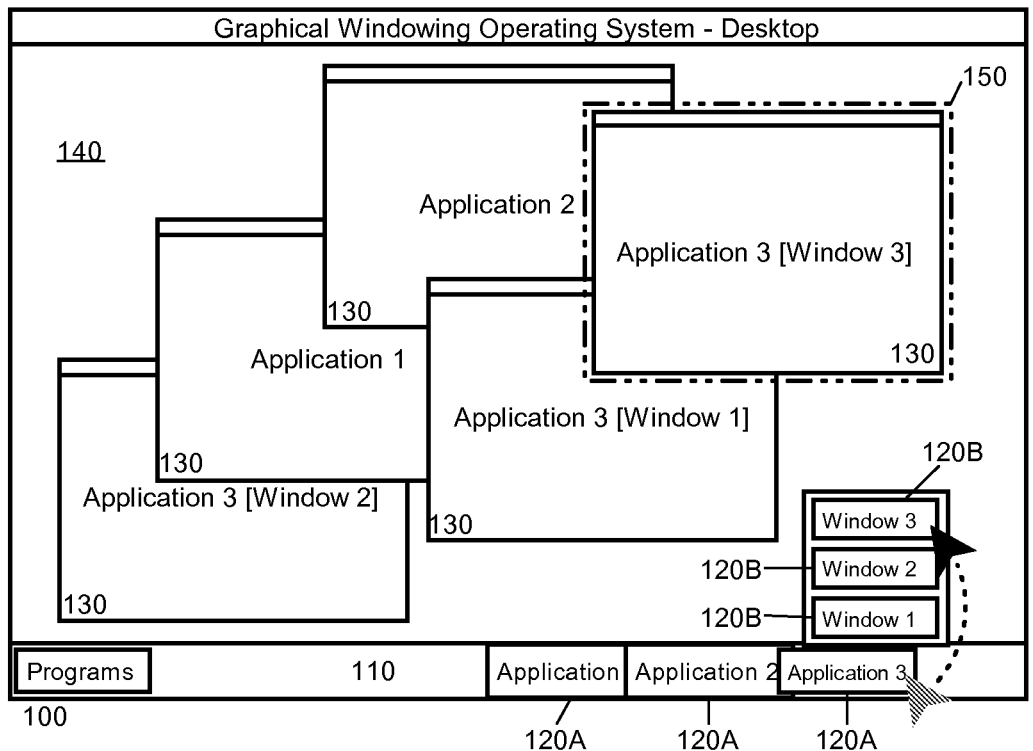
Figure 1C:
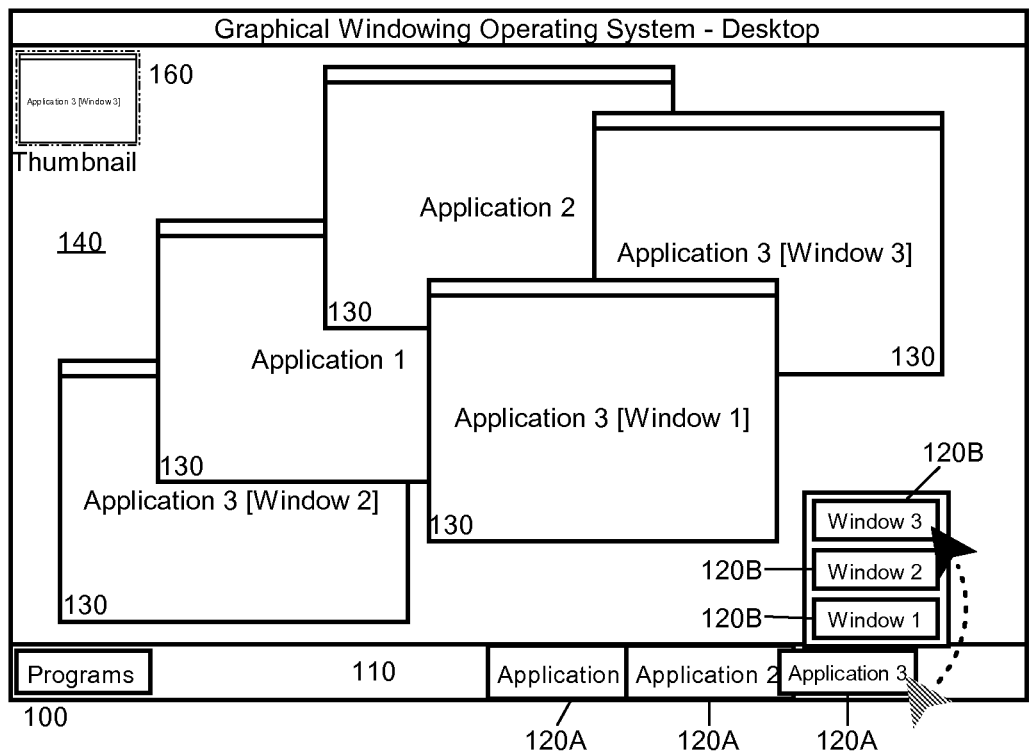

Continuing with FIG. 1B, in addition to applying highlights to a particular one of the windows 130 associated with a corresponding one of the entries 120A, 120B experiencing a proximity event, a copy of the content in the particular one of the windows 130 can be placed as a phantom image in the same portion of the x-y space of the desktop 140, but at the foreground of the z-space of the desktop 140. As yet another alternative, in FIG. 1C a thumbnail image 160 of the particular one of the windows 130 can be rendered in the desktop 140 so as to highlight the particular one of the windows 130 without tampering with the ordering of the windows in the z-space of the desktop 140.

Figure 1D:
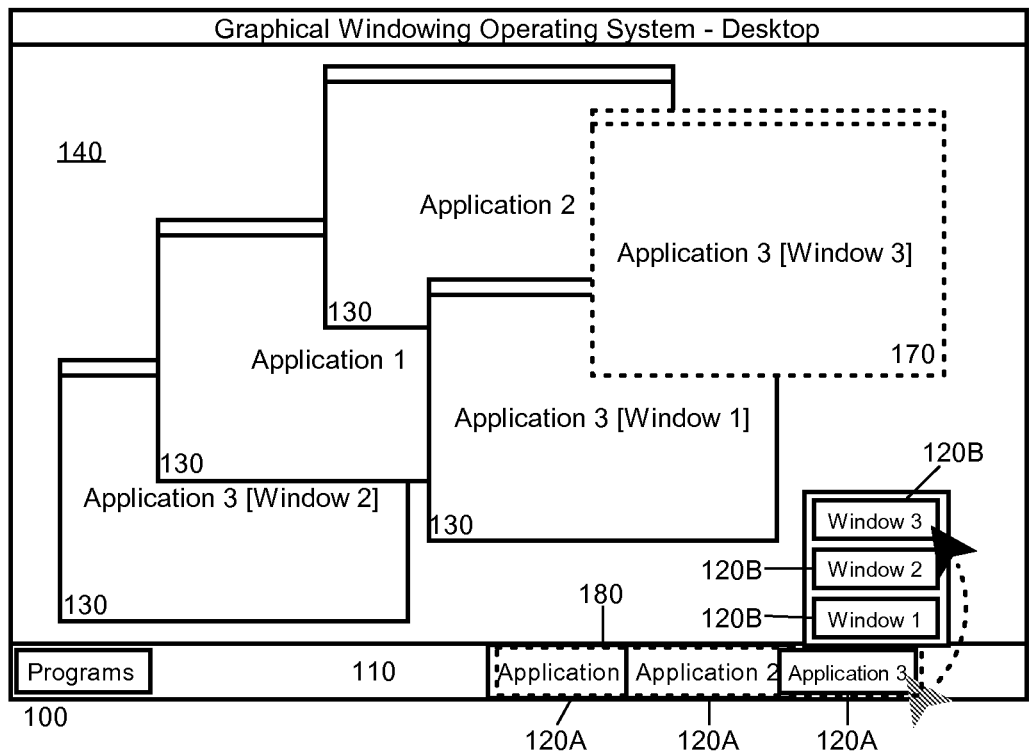

Finally, as even yet another alternative, in FIG. 1D when the particular one of the windows 130 has been minimized, a phantom image of the particular one of the windows 130 can be rendered in the same portion of the x-y space of the desktop 140 where the particular one of the windows 130 would otherwise be rendered in a normalized state. Additionally, the task bar 110 can be highlighted to indicate the minimized state of the particular one of the windows 130. Yet, the ordering of the windows 130 in the z-space of the desktop 140 can remain.

Figure 2:
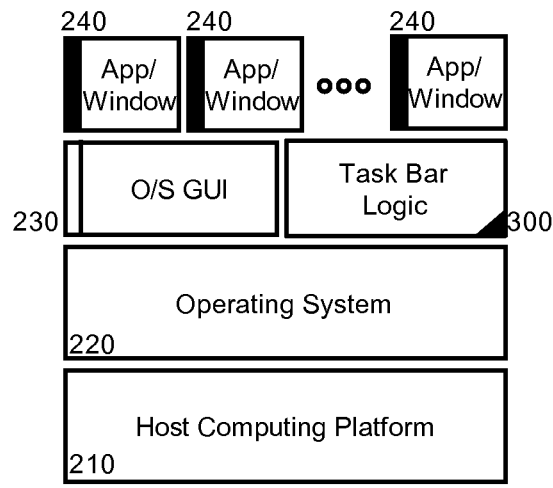
FIG. 2 is a schematic illustration of a windowing data processing system configured for task bar graphical association; and, FIG. 3 is a flow chart illustrating a process for task bar graphical association in a desktop for a windowing operating system.

In even yet further illustration, FIG. 2 is a schematic illustration of a windowing data processing system configured for task bar graphical association. The system can include a host computing platform 210. The host computing platform 210 can support the operation of a windowing operating system 220. The windowing operating system 220 can include a GUI 230 supporting the visual display of one or more windows/application views 240. Finally, task bar logic 300 can be coupled to the operating system GUI 230.

Figure 3:
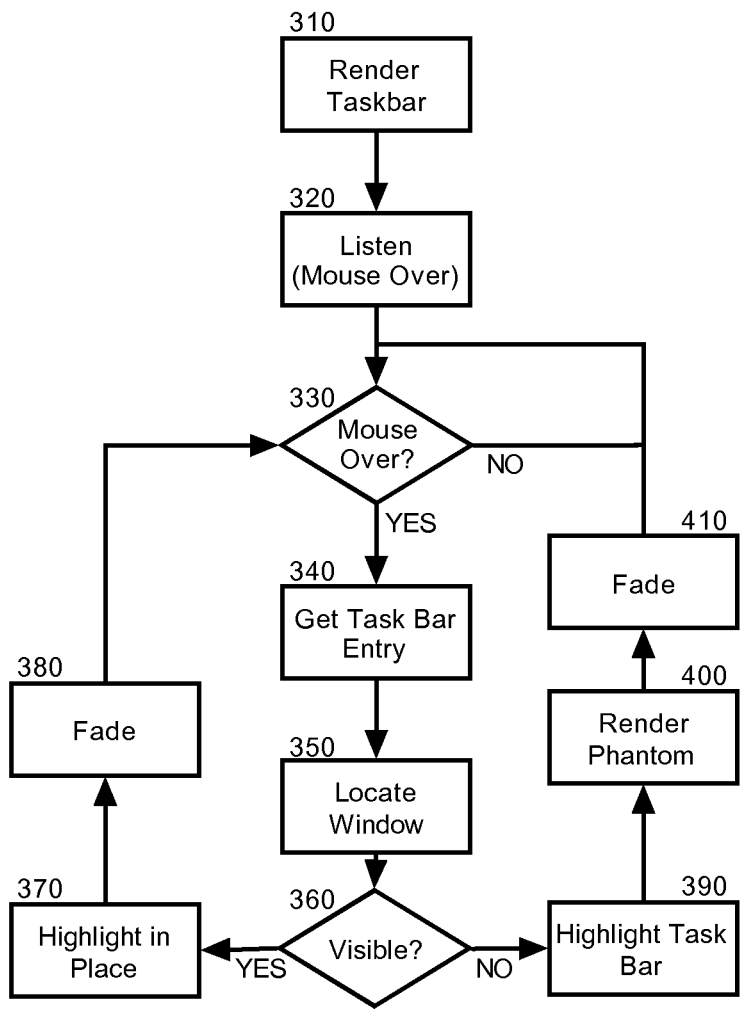

The task bar logic 300 can include program code enabled to provide a graphical association between a window in the operating system GUI 230 and an entry in a task bar in the operating system GUI 230. More particularly, referring to FIG. 3, beginning in block 310, the task bar can be rendered in the operating system GUI. In block 320 once the task bar has been rendered along with entries corresponding to different windows in the desktop for the operating system GUI, each of the entries can be monitored for the occurrence of a mouse over event.

In decision block 330, if a mouse over event is detected in association with a particular one of the entries in the task bar, in block 340, the task bar entry can be identified and in block 350, the window associated with the task bar entry can be located. Thereafter, in decision block 360 it can be determined whether the located window is visible. If so, in block 370 the located window can be highlighted in place without re-arranging the ordering of windows in the z-space of the desktop. Subsequently, in block 380 the highlighting can fade and the process can repeat through decision block 330. By comparison, in decision block 360, if the located window is not visible and hence minimized, in block 390 the task bar can be highlighted and in block 400, a phantom of the window in a normalized state can be rendered before fading in block 410. Thereafter, the process can repeat in decision block 330.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer program product comprising a non-transitory computer usable medium embodying computer usable program code for graphically associating a window with a task bar entry in a windowing operating system graphical user interface, the computer program product including:
   computer usable program code for rendering a multiplicity of windows in a z-space sequence in a desktop of the windowing operating system graphical user interface;
   computer usable program code for detecting a proximity event for an entry in a task bar for the windowing operating system graphical user interface, wherein the proximity event is a mouse-over event for an entry in the task bar for the windowing operating system graphical user interface; and,
   computer usable program code for highlighting a corresponding one of the multiplicity of windows in the desktop without re-ordering the z-space sequence, by rendering a phantom duplicate of the corresponding one of the multiplicity of windows in a foreground position in the z-space sequence and in an x-y space position of the desktop comparable to an x-y space position of the corresponding one of the multiplicity of windows duplicated by the phantom duplicate, the corresponding one of the multiplicity of window having content partially obscured by overlapping ones of the multiplicity of windows in the z-space sequence but maintaining a view of portions of the content not obscured by the overlapping ones of the multiplicity of windows, while the phantom duplicate shows all content of the corresponding one of the multiplicity of windows.

2. The computer program product of claim 1, wherein the computer usable program code for highlighting a corresponding one of the windows in the desktop without re-ordering the z-space sequence, comprises computer usable program code for applying a distinct border to the corresponding one of the multiplicity of windows in the desktop without re-ordering the z-space sequence.

3. The computer program product of claim 1, wherein the computer usable program code for highlighting a corresponding one of the multiplicity of windows in the desktop without re-ordering the z-space sequence, comprises computer usable program code for rendering a thumbnail image of the corresponding one of the multiplicity of windows in the desktop.

4. The computer program product of claim 1, wherein the computer usable program code for highlighting a corresponding one of the multiplicity of windows in the desktop without re-ordering the z-space sequence, further comprises:
   computer usable program code for highlighting the task bar.

* * * * *